United States Patent [19]

Tayloe

[11] Patent Number: 5,987,325
[45] Date of Patent: Nov. 16, 1999

[54] MULTIPLE SMART CARD PHONE AND METHOD

[75] Inventor: Daniel Richard Tayloe, Phoenix, Ariz.

[73] Assignee: Motorola, Inc., Schaumburg, Ill.

[21] Appl. No.: 08/858,619

[22] Filed: May 19, 1997

[51] Int. Cl.[6] .................................... H04B 1/33
[52] U.S. Cl. .................. 455/435; 455/552; 455/558; 455/575; 379/357
[58] Field of Search .................. 455/422, 432, 455/436, 435, 525, 550, 551, 552, 553, 558, 575, 90, 426, 557; 379/357

[56] References Cited

U.S. PATENT DOCUMENTS

| | | | |
|---|---|---|---|
| 5,301,359 | 4/1994 | Van Den Heuvel et al. | 455/552 |
| 5,336,877 | 8/1994 | Raab et al. | 235/475 |
| 5,404,580 | 4/1995 | Simpson et al. | 455/558 |
| 5,428,666 | 6/1995 | Fyfe et al. | 455/551 |
| 5,655,003 | 8/1997 | Erving et al. | 455/434 |
| 5,764,730 | 6/1998 | Rabe et al. | 455/415 |

FOREIGN PATENT DOCUMENTS

| | | |
|---|---|---|
| 0 556 970 A1 | 8/1993 | European Pat. Off. . |
| 2 269 512 | 9/1994 | United Kingdom . |
| 2 299 192 | 9/1996 | United Kingdom . |

OTHER PUBLICATIONS

PCT WO 92/19078 Julin, Aug. 1992.
PCT WO 94/08433 Ab Nordictel, Apr. 1994.

*Primary Examiner*—Doris H. To
*Attorney, Agent, or Firm*—Gregory J. Gorrie

[57] ABSTRACT

A telephone, such as a radiotelephone, is provided having the capability to concurrently operate with two subscriber identification module (SIM) cards. The telephone advantageously permits a single phone to have two telephone numbers associated therewith.

20 Claims, 3 Drawing Sheets

MULTIPLE SMART CARD PHONE AND METHOD

FIELD OF THE INVENTION

The present invention pertains to communication systems, in general, and to personal communication systems of a type utilizing a Subscriber Identification Module (SIM), in particular.

BACKGROUND OF THE INVENTION

In radiotelephone systems such as the Global System for Mobile Communications (GSM) radiotelephone system in use in Europe, a SIM card is inserted into a radiotelephone for providing subscriber identification, billing information and other information concerning the operation of the radiotelephone. The SIM is a key component of the GSM and typically comprises a smart card which is inserted into a GSM phone in order to make the phone work.

In a typical cellular telephone communication system, each subscriber unit is assigned a mobile subscriber (MSI) which uniquely identifies the subscriber unit from other subscriber units. In the European cellular communication system, one such identifier is the international mobile subscriber identification number (IMSI). To protect the privacy of the BMSI.

It is highly desirable to provide a personal communication system which has a single personal telecommunications device which is operable in all available cellular systems, e.g., AMPS, TDMA, CDMA, GSM, etc. across all available cellular frequencies, e.g., 900 MHz or 1800 MHz as well as satellite frequencies, and which operates like an inexpensive cordless phone when the user is at home.

In conjunction with such an approach the user has a single phone number, and that phone number tracks that phone such that wherever the phone is, that is where the user is.

In the SIM environment, a user is not constrained to carry his own personal communications device on him at all times, since it is SIM plus a generic, non-user specific communications device which the system sees, as opposed to a specialized, user specific device such as a conventional wireline phone or a conventional non-GSM cellular phone. In a network where you have one user-one number, this is desirable.

One concern of the users of such devices is that of privacy. Cordless phones now have simple forms of voice privacy which are proprietary to each manufacturer or specific model or phone. If cellular telephone is to become so pervasive as to begin to supplant normal wireline phones, using well defined, standard air interfaces, the privacy of these calls needs to be addressed.

There may arise many situations whereby there is only one communications device, but yet several people, each having their own number, wants that to be reached via that device. One example would be at home. One spouse may have a personal universal number, the other spouse yet another number, and perhaps another one for each teenage sons or daughters. In such a circumstance, it would be clearly undesirable for them each to have a unique phone that rings only their number when at home. In other situations such as, for example, a car pool situation, several people, each having their own SIM providing their own unique secure communications, may all wish to receive calls addressed to their individual SIM to be received on a single car phone.

It may be desirable for a person to have two universal numbers, one for personal communications, and one for work. It seems unlikely that it would be desirable to have a single number used for both work and a personal life, as these two different types of calls usually require different telephone mannerisms when first answering such calls. In such dual number cases, the personal number may be in force almost all the time, while the work number is used primarily at the office but occasionally at home or while in the car. In such case, it would be desirable for the user to be able to receive calls in secure communications mode for both numbers at once.

In another situation easiest understood by way of an example, a computer network person assigned to a help line may be on call for overnight or weekend emergency service. If the computer help line numbers is on a SIM, a computer network specialist could take that SIM home and place it in his home telephone coupled to the conventional wire line phone and receive help line calls there or in his car phone while driving around town, both using a secure mode of communications. However, at the same time he would like to be able to receive personal calls from his personal number.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

U.S. Pat. Nos. 5,615,260; 5,257,414 and 5,444,764 all issued to Motorola, Inc., the assignee of the present invention, are incorporated herein by reference.

Figure 1:
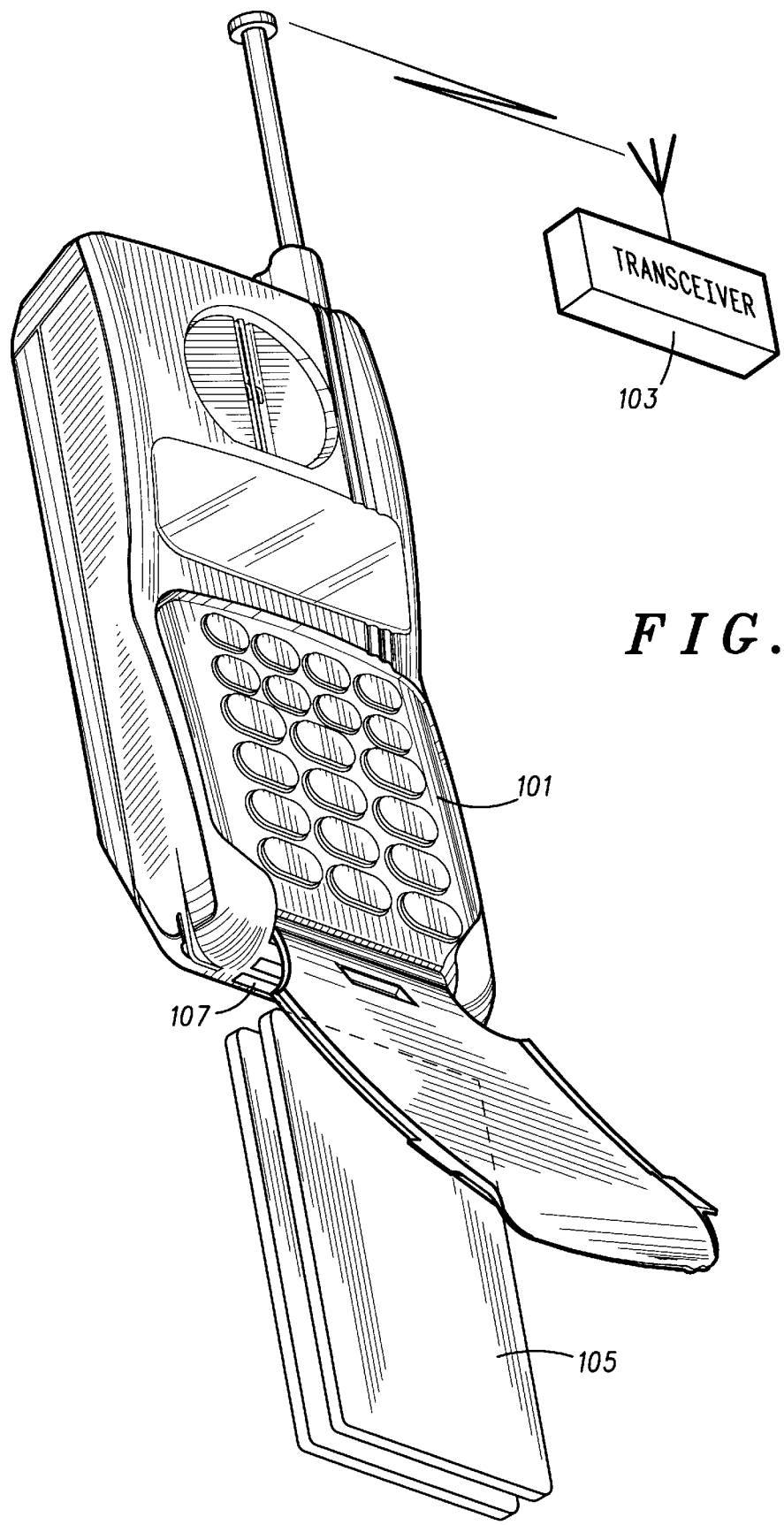
FIG. 1 is an illustration of a radiotelephone system in accordance with a preferred embodiment the present invention.

FIG. 1 is a block diagram of a radiotelephone communications system in accordance with a preferred embodiment of the present invention. The fixed site transceiver 103 transmits and receives radio frequency (RF) signals to and from mobile and portable radiotelephones located within a fixed geographic service area. Radiotelephone 101 is one of the portable radiotelephones served by the fixed site transceiver 103. The RF signals transmitted between the fixed site transceiver 103 and the portable radiotelephone 101 include data or voice signals, subscriber identification, and billing information. The billing information sent from the portable radiotelephone 101 to the fixed site transceiver 103 is stored in a memory contained on SIM cards 105. Each SIM card 105 can be a full size or a chip size smart card. The billing information contained within each SIM card 105 is read by a card reader contained within the radiotelephone 101. The card reader may be of the type described in the aforementioned U.S. Pat. No. 5,615,260.

Figure 2:
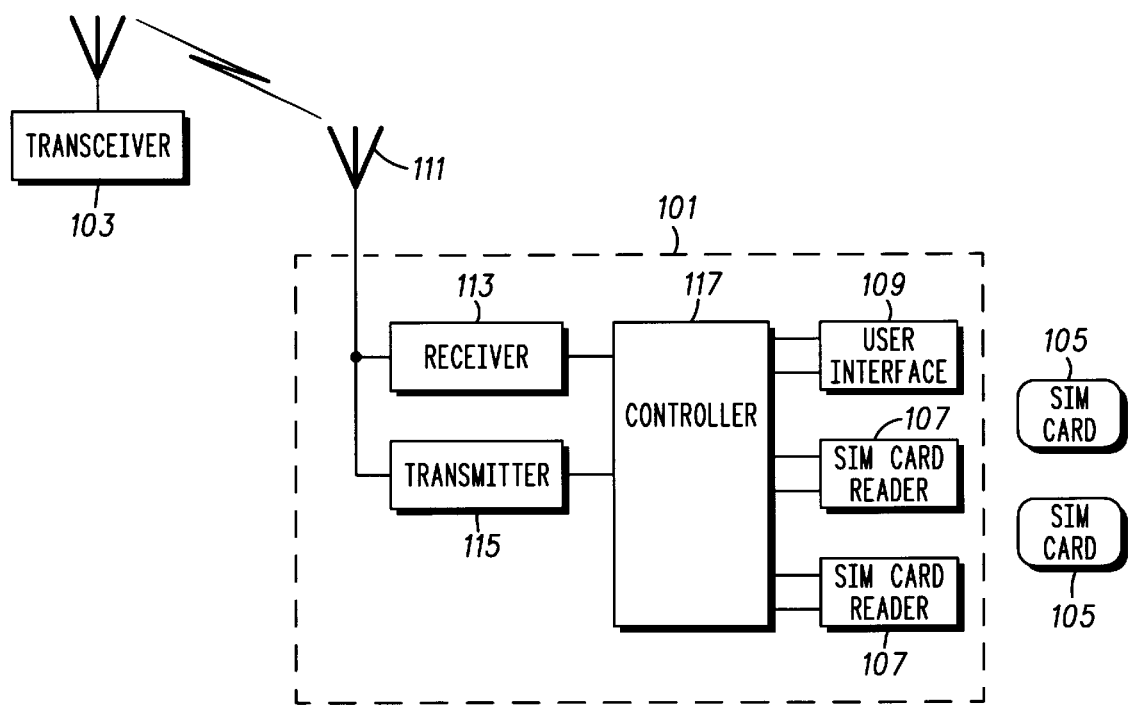
FIG. 2 is a block diagram of the radiotelephone system of FIG. 1 in a preferred embodiment the present invention.

FIG. 2 is an illustration in block diagram form of the radio telephone system of FIG. 1 in accordance with a preferred embodiment of the present invention. Upon power-up of the radiotelephone 101, one or two SIM cards 105 are inserted by the user into the SIM card readers 107 contained within the radiotelephone 103. Upon insertion of one SIM card 105, the radiotelephone 101 prompts the user through the user interface 109 to insert a personal identification number (PIN) to unlock the SIM card allowing access to the subscriber information contained therein. In other embodiments, the SIM card may not require the entry of a PIN number to unlock the subscriber information contained therein. Upon entering the SIM card access PIN, the radiotelephone 103 executes the process illustrated in FIG. 3 and subsequently described in detail. After successfully completing the process 200, a radiotelephone 101 is fully registered for service in the radiotelephone system 100 of FIG. 1. The radiotelephone 101 is now able to send and receive RF signals from the remote transceiver 101.

While receiving RF signals from the transceiver 103, the radio telephone 101 uses the antenna 111 to couple the RF signals and to convert the RF signals into electrical RF signals. The electrical RF signals are received by the radio receiver 113 for use within the radio telephone 101. The receiver 113 demodulates the received electrical RF signals and outputs information signals for use by the controller 117. The controller 117 formats the symbol signal into voice or data for use by the user interface 109. The controller 117 includes a microprocessor, such as a MC68332 available from Motorola, Inc., and memory devices such as RAM and EEPROM. The user interface 109 is used to convey information between a user and the radio telephone 101, typically including a microphone, a speaker, a display, a data port and a keypad.

Upon the transmission of the RF signals from the portable radio telephone 101 to the transceiver 103, the voice and/or data signals from the user interface 109 are processed by the controller 117. The processed signals are input into the transmitter 115. The transmitter 115 converts the data into electrical RF signals. The electrical RF signals are converted into RF signals and output by the antenna 111. The RF signals are received by the transceiver 103 and converted for use with a land line telephone system.

Prior systems allow one number, e.g., a work number, to be forwarded to a home phone. However, the home phone number is usually shared between all family members, which makes it difficult to automatically redirect calls for just one member of the family to another phone, such as to a cellular phone or a work phone. Furthermore, since in the future wireless environment the home phone may be a cellular phone itself, and require inputs from individual users on the encryption data unique to them.

In accordance with the principles of the invention a communications device 101 is provided with the capability to accept multiple SIM cards 105, each with their own user specific encryption algorithms, and therefore be able to provide service (in particular, to be able to accept incoming calls) for more than one user. As each different SIM card is inserted into the communications device 101 the device 101 can keep track of the encryption necessary for each user and, if necessary, register that person on the system currently providing service.

For a conventional wire line communications unit (a corded or cordless phone), the unit contacts the network service provider such that all incoming calls will be routed to this communications unit, encrypted as specified by the SIM card 105.

Communications devices with multiple SIM capability allow a person to accept calls at a single communication device for either his personal number, his work number or for both at the same time. The user simply needs to insert the appropriate SIM(s).

It is especially desirable for a common phone to accept multiple universal number SIMs, each having its own secure communications database. The situation of "work at home" employees (having a SIM with a work related, secure, universal number) underscore the need for such a device.

Several different people each with different numbers (SIM cards) can receive secure calls on a common communications device on a dynamic basis. Given the one number, one person environment where the number follows a person everywhere, both on wireline and wireless systems, a secure device such as this will be necessary.

The invention provides a method of dealing with multiple secure numbers per user (work/business/personal) as well as multiple users per secure communications unit (such as a family with several different personal numbers).

Figure 3:
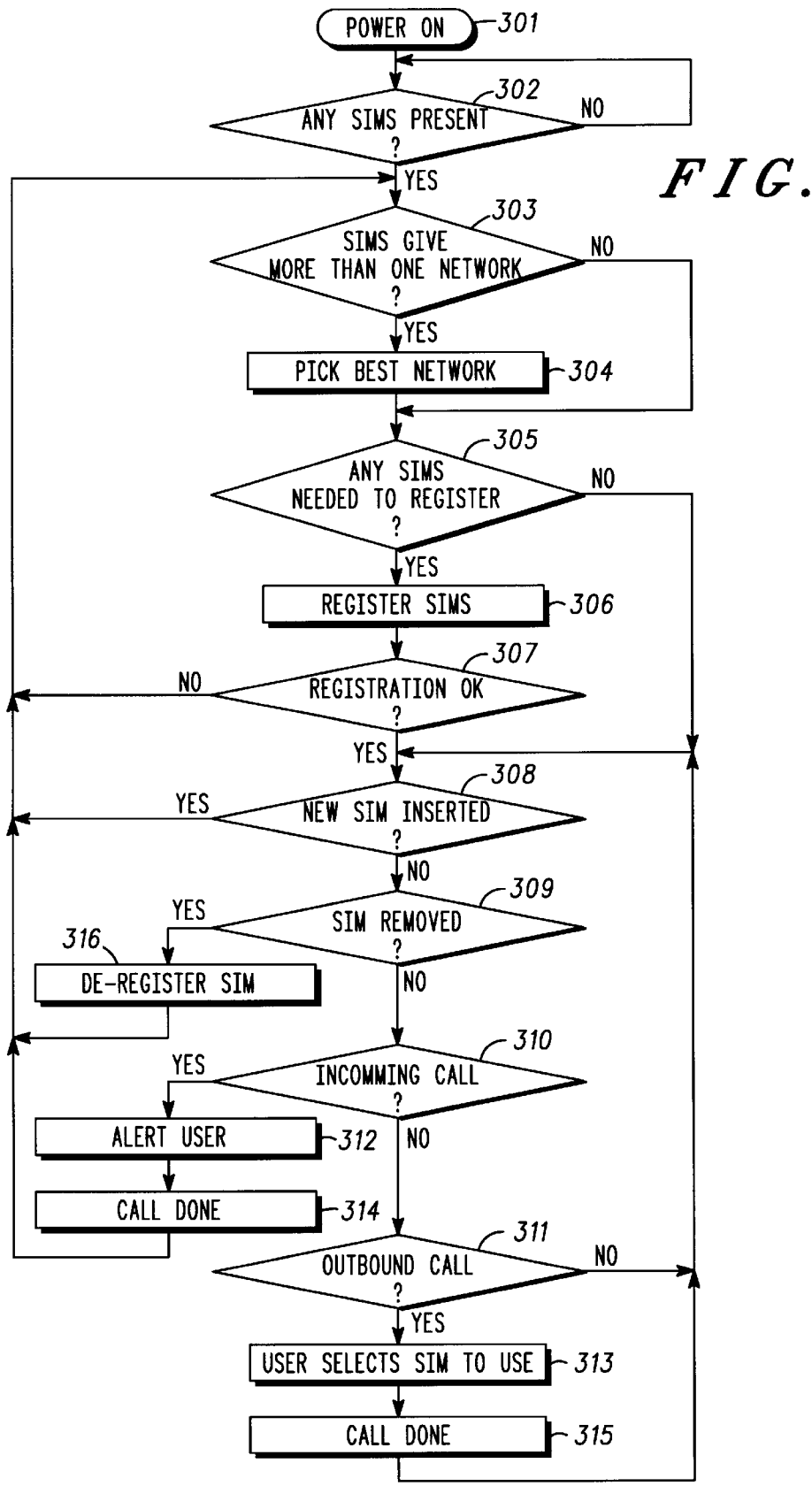
FIG. 3 is a flow chart of the operation of the radiotelephone of FIGS. 1 and 2 in a preferred embodiment the present invention.

FIG. 3 is a flow chart of the operation of the radiotelephone of FIGS. 1 and 2 in a preferred embodiment the present invention. In step 301 the phone is turned on. After the phone is turned on, the phone checks at step 302 to see if there is at least one SIM card 105 present. If there are no SIM cards 105 present, the phone will wait for one to be inserted before continuing.

Given one or more SIM cards 105 are present, in step 303 a check occurs to determine if the SIM cards 105 have data for more than one providing network (wireless or wireline). If there is no more than one available network, step 304 is skipped and step 305 is next.

If there is data for more than one network, the best network is selected in step 304. This step may involve searching to determine which networks are currently available, and selecting among these based upon factors such as personal preference, cost, reliability, perhaps throughput (in the case of data transactions), and perhaps user priority, either indicated by the SIM cards 105 or manually invoked.

With multiple SIM cards 105, each SIM card 105 may have associated with it several allowed networks (wireless or otherwise). Since the phone is probably capable of only monitoring incoming calls on a single system, the "best" system will need to take into account the needs of all the SIM cards 105 and their associated allowable networks, and try to pick a "best" system that represents common ground for all the SIMs.

It may be that the phone could listen for rings on more than one network, limited to perhaps two at a time or only certain combinations. For example, a dual receiver phone may be able to listen to two separate systems at the same time. In another example, systems that are time division multiplexed, such as GSM, PCS, and TDMA, may have ring alerts arriving at different times such that a single receiver could time multiplex itself and possibly keep track of rings from several systems at the same time.

For such phones able to listen for incoming calls on more than one system, different SIM cards 105 may get registered on different systems.

Once a service is selected, a check is performed at step 305 to determine for each SIM card 105, if that SIM card 105 is already registered on the selected network.

If a SIM is not already registered on the selected network, the phone attempts to register the SIM card 105 on the selected network in step 306.

If the attempted registration attempt is not successful, the unit will go back to step 303 and attempt to select another network, removing from consideration the network that just failed for that particular SIM in step 307.

The failure of one number to get registered may cause the phone to select another "best" system for the other SIMs as well.

Once all the universal numbers have been registered that can be, the unit sits in a loop watching for one of four things to happen: receipt of an incoming call, making an outbound call, inserting a SIM card 105 or removal of a SIM card 105.

If task 310 determines that the call is incoming, in step 312, the phone alerts the user of an incoming call and indicates which number it is for. The phone may differentiate between the various SIMs by different audio tones or tone sequences, or visually such as via a display indicating which SIM user the call is for.

When an incoming call is received, the phone will check for the security preference for that network and that number and will or will not activate secure communications based upon those preferences. Security normally means voice and data encryption/decryption.

These security preferences may also be manually over ridden by the user. Alternatively, the incoming call may indicate a desired security preference which the phone will respond to, given the security information on the SIM.

In step 311, when an outgoing call is made, the user selects which SIM against which to place the call (step 313). Preferences for security from the SIM card can either be automatically applied or manually invoked. Security normally means encrypting/decrypting the incoming and out going voice and/or data.

In step 308, a SIM card 105 (FIG. 1) is inserted into the phone. Alternatively, the SIM card 105 may already physically be in the phone, but has only now been enabled. A user may optionally selectively enable or disable the SIM numbers and that the phone is looking for incoming calls for. For example, a user may have inserted a SIM card 105 corresponding to his normal work identity. After hours, he may not want to be disturbed by calls from work, so that SIM card 105 might be deactivated, either manually or automatically via a stored schedule.

The deactivation process can reside in either the SIM 105 or in the phone. In either case, the SIM card 105 may optionally contain a schedule for activation/deactivation for each number. If the phone is taking care of this, it can read the schedule information on the SIM and, knowing the current time, can itself determine when to activate or deactivate the number. Alternatively, the SIM can keep track of time itself, and activate/deactivate the number at the appropriate time by notifying the phone. When task 309 determines that a SIM card is removed, task 316 may deactivate or deregister the SIM card.

A new SIM will require that step 303 be revisited in order to determine and reevaluate the "best" network for the new SIM card 105 and the networks valid for it.

When a SIM card 105 is removed, the user is normally deregistered with the network it was connected to. Alternatively, as discussed with the SIM insertion case above, the SIM may physically still be present, but "deactivated". This may happen according to a scheduled event (turn off a number at a scheduled time) or alternatively may be manually invoked (user no longer wants to receive calls on that number).

When a number is deactivated, for example, by removing the SIM card 105 or by manually or automatically disabling it, step 303 needs to be revisited in order to determine if the "best" network now needs to change.

In the above process, it is assured that a SIM card 105 needs to be present in the phone the entire time the phone is watching for incoming calls. If a SIM card 105 is removed, the number on the SIM card 105 is deactivated in the phone and may be detached (un-registered) with the network it is registered with.

Alternatively, a SIM card 105 could just be placed in the phone long enough for the phone to read the information on the SIM card 105. From there, the phone would act as if the SIM card 105 is in the phone.

The data from a SIM card 105 is copied into a phone memory, the phone could register and use the number on the SIM cad 105 until the SIM card 105 is used elsewhere in the network. At that point in time, as that SIM card 105 is registered with the new device, it is detached (un-registered) with the last used phone.

This changes the above flow chart in a minor way. There is no deactivation upon the removal of the SIM as shown in task 316.

When an outbound call is completed, task 315 returns the procedure to task 308. When an inbound call is completed, task 314 returns the procedure to task 303.

The invention has been described with reference to specific embodiments. As will be understood by those skilled in the art, various modifications may be made without departing from the spirit and scope of the invention.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of control access of a telephone in telephone systems comprising the steps of:

accepting in said telephone a first subscriber identification module (SIM) card, said first SIM card containing a first universal identification number;

accepting in said telephone a second SIM card, said second SIM card containing a second universal identification number;

attempting to register said telephone in a first telephone system using said first universal identification number;

attempting to register said telephone in said first telephone system using said second universal identification number concurrent with said first number being registered;

determining from said first SIM card if it contains first data for more than one providing telephone system and selecting said first providing telephone system for registration of said first universal identification number;

determining whether said registration attempt with said first universal identification number in said first providing telephone system is unsuccessful; and attempting to register said first universal number with an alternate providing telephone system if said attempt is unsuccessful.

2. A method in accordance with claim 1, wherein:
said telephone is a radiotelephone.

3. A method in accordance with claim 2, wherein:
said radiotelephone is a cellular telephone.

4. A method in accordance with claim 1, comprising the steps of:
   determining from said first SIM card if it contains first data for more than one providing telephone system;
   determining from said second SIM card if it contains second data for more than one providing telephone system; and
   selecting a providing telephone system for registering said first and second universal identification numbers based upon said first and second data.

5. A method in accordance with claim 1, further comprising the step of:
   determining from said second SIM card if it contains second data for more than one providing telephone system and selecting a second providing telephone system for registration of said second universal identification number.

6. A method in accordance with claim 1, further comprising the step of attempting to register said second universal identification number with said alternate telephone system.

7. A method in accordance with claim 6, further comprising the steps of:
   determining whether said registration of said second universal identification number is unsuccessful; and
   attempting to register said second universal identification number with another alternate telephone system.

8. A method in accordance with claim 1, further comprising the steps of:
   providing a first alert indication to indicate incoming calls are for said first universal identification number; and
   providing a second alert indication to indicate incoming calls are for said second universal identification number.

9. A method in accordance with claim 1, further comprising the step of:
   selecting one of said first or second universal identification numbers for an outgoing call.

10. A method in accordance with claim 1, further comprising the step of:
    deregistering said first universal identification number upon removal of said first SIM card from said telephone.

11. A method in accordance with claim 1, further comprising the step of:
    deregistering said first universal identification number upon the occurrence of a predetermined activity.

12. A telephone comprising:
    means for accepting a first SIM card, said first SIM card containing a first universal identification number;
    means for accepting a second SIM card, said second SIM card containing a second universal identification number;
    SIM card reading circuitry for reading said first and second universal identification numbers from said first and second SIM card;
    circuitry for coupling said telephone to a telephone system; and
    a controller, said controller being operable to register said telephone in said telephone system by using said first universal identification number and being further operable to register said telephone in said telephone system using said second universal identification number, said second registration being concurrent with said first registration, said controller utilizing said circuitry to access said telephone system, wherein said controller determines from said first SIM card if said first SIM card contains first data for more than one providing telephone system and for determining from said second SIM card if said second SIM card contains second data for more than one providing telephone system, and being further operable to select a providing telephone system for registering said first and second universal identification numbers based upon said first and second data, and wherein said controller is operable to attempt to register said first universal identification number with a first providing telephone system and further operable to determine whether said registration attempt is unsuccessful and operable to attempt to register said first universal number with an alternate providing telephone system if said attempt is unsuccessful.

13. A telephone in accordance with claim 12, wherein:
said telephone comprises a cellular telephone.

14. A telephone in accordance with claim 12, wherein:
said controller determines from said first SIM card if said first SIM card contains first data for more than one providing telephone system and being further operable to select a first providing telephone system for registration of said first universal identification number.

15. A telephone in accordance with claim 14, wherein:
said controller determines from said second SIM card if said second SIM card contains second data for more than one providing telephone system and being further operable to select a second providing telephone system for registration of said second universal identification number.

16. A telephone in accordance with claim 12, wherein:
said controller is operable to attempt to register said second universal identification number with a second network, and operable to determine whether said registration of said second universal identification number is unsuccessful and operable to attempt to register said second universal identification number with another network.

17. A telephone in accordance with claim 12, comprising:
means for providing a first alert indication to indicate incoming calls are for said first universal identification number and means for providing a second alert indication to indicate incoming calls are for said second universal identification number.

18. A telephone in accordance with claim 12, wherein:
said controller is operable to select one of said first or second universal identification numbers for an outgoing call.

19. A telephone in accordance with claim 12, wherein:
said controller is operable to deregister said first universal identification number upon removal of said first SIM card from said telephone.

20. A telephone in accordance with claim 12, wherein:
said controller is operable to deregister said first universal identification number upon the occurrence of a predetermined activity.

* * * * *